United States Patent [19]
Classen

[11] 3,716,323
[45] Feb. 13, 1973

[54] INJECTION MOLDING MACHINE

[75] Inventor: Günter Classen, Monchengladbach, Germany

[73] Assignee: Mannesmann-Meer Aktiengesellschaft, Monchengladbach, Germany

[22] Filed: Dec. 14, 1971

[21] Appl. No.: 207,922

[52] U.S. Cl. ............... 425/450, 425/167, 164/343
[51] Int. Cl. ............................................ B28b 3/26
[58] Field of Search......425/150, 436, 156, 162, 243, 425/247, 249, 326, 330, 340, 352, 353, 387, 444, 450, 451, 161, 167; 164/315, 343; 269/27

[56] References Cited

UNITED STATES PATENTS

| 2,174,847 | 10/1939 | Stacy | 164/315 |
|---|---|---|---|
| 2,689,978 | 9/1954 | Roger | 425/450 |
| 3,093,863 | 6/1963 | Ehlert | 425/450 |
| 3,156,014 | 11/1964 | Wenger | 425/247 |
| 3,677,685 | 7/1972 | Aoki | 425/450 |
| 3,687,590 | 8/1972 | Cyriax | 425/444 |

Primary Examiner—Robert D. Baldwin
Assistant Examiner—John S. Brown
Attorney—Ralf H. Siegemund

[57] ABSTRACT

An injection molding machine having a stationary support one mold half, and a movable carrier for the other second half. The movable carrier runs on rods and has a cylinder chamber with a first piston from which extends a piston rod; lock means may hold the rod in a particular position when retracting the lock, rod and piston can be displaced; a hydraulic motor including a cylinder attached to the carrier underneath thereof, has a stationary piston with two tubular piston rods, serving as conduits to and from the motor cylinder; first hydraulic control means provide for selectively pressurizing the motor cylinder to obtain relative displacement thereof by action on the second piston, thereby displacing the carrier. Second hydraulic control means selectively pressurize the chamber in the carrier on one or the other side of the first piston in the chamber for displacement of the carrier relative to the piston when the lock means have locking position, and for closing the chamber so that incompressible pressure fluid therein couples the first piston to the carrier for common displacement upon operation of the hydraulic motor when the lock means are retracted.

2 Claims, 1 Drawing Figure 3,716,323
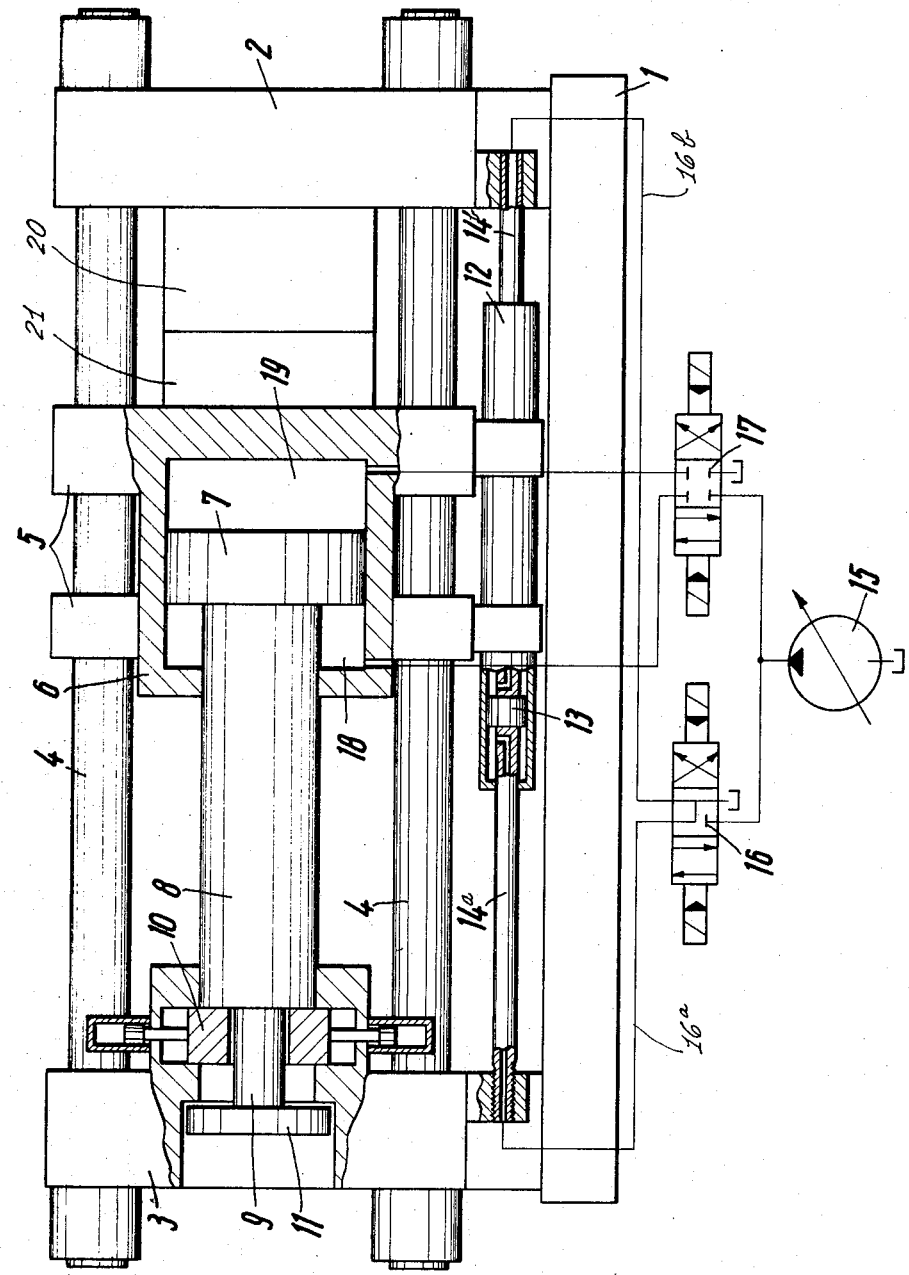

INJECTION MOLDING MACHINE

The present invention relates to improvements in injection molding machines for thermoplastics and here particularly to apparatus for hydraulically opening and closing the molds. Mold closing apparatus is used, for example, in injection molding machines having one stationary and one moveable platen, respectively serving as holders for two complementary mold halves, and the invention relates to particulars of the hydraulic platen displacement and mold height adaptation.

An injection molding machine of the type referred to above has one displaceable mold half carrier that runs on guide rods, which extend between the stationary holder and support for the other mold half and a second stationary support. The displacement of the carrier is carried out in relation to the stationary mold half as mounted on a stationary support. The moveable or displaceable mold half carrier is constructed as a completely closeable pressure chamber, receiving a displaceable piston, whereby two mutually isolated pressure chambers are established, which can be pressurized individually, e.g., alternately. It is a particular object of the present invention to provide a hydraulic mold closing apparatus of short construction using as few components as possible, the components to be of simple construction, but carrying out the necessary function at a high degree of reliability.

In accordance with the preferred embodiment of the present invention, it is suggested to provide the piston with a rod that extends out of the cylinder chamber and can be locked to the second stationary support. Upon unlocking, piston and piston rod can be displaced upon displacement of the carrier. A hydraulic motor is disposed underneath the guide rods for driving the mold half carrier, and upon closing the cylinder chamber, the piston therein is in effect coupled to the carrier by means of incompressible fluid therein provided, of course, the rod was unlocked. Through independent pressure control of the cylinder chamber and upon locking the piston rod, the carrier as mold holder is displaced relative to the piston for final mold closing and initial mold opening.

The hydraulic motor means is preferably constructed as cylinder piston arrangement, wherein the cylinder is coupled to the carrier and the piston is stationary. The motor means may include plural such motors operating in parallel. Two piston rods of a motor hold the piston thereof in position, between the two supports and parallel to and underneath the guide rods. Axial bores in the piston rods for the motor serve as fluid conduits for running pressure fluid into (or discharge from) the motor cylinder chamber.

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

The FIGURE is a partially schematic illustration of a mold closing apparatus for an injection molding machine, in accordance with the preferred embodiment of the present invention.

Proceeding now to the detailed description of the drawing, there is illustrated the construction of a mold closing apparatus, but the injection equipment proper has been omitted in order to facilitate and simplify construction; in corporation of the injection equipment will be apparent to those skilled in the art.

There is provided a frame 1 on which is mounted a stationary mold support and platen 2 for a first mold half 20. Furthermore, another stationary support is mounted on frame 1. The two stationary supports 2 and 3 are interconnected by means of guide rods 4. The rods 4 serve as rails for slidingly supporting a displaceable mold carrier 5, the other mold half 21 being mounted on that carrier.

The moveable mold half carrier 5 is constructed as a closed cylinder chamber 6, and the cylinder chamber has particular configuration for slidingly, but sealingly receiving a piston 7. The piston 7 is permitted to run in the cylinder on pressure imbalance on both sides. Accordingly, pressure in the two pressure chambers 18 and 19 determines the relative position of piston 7 in cylinder 6, provided, piston 7 is not locked otherwise.

A piston rod 8 extends from piston 7 towards and into support 3. A ring groove 9 is provided at that end of rod 8. Locking elements 10, when protracted, project into the ring groove 9. In the illustrated position locking members 10 engage one shoulder of the groove 9, but they also engage stationary support 3. Thus, rod 8 bears against that support particularly upon exertion of pressure on piston 7, tending to shift the piston to the left. The locking members 10 run in recesses provided for that purpose in the support 3. Moreover, the members 10 are coupled to pistons that run in cylinders for hydraulic displacement of the locking members 10.

The left-hand end of rod 8 is again of larger diameter resembling a disk or piston 11 that runs in a bore of support 3. A shoulder of that bore limits permissible displacement of piston or disk 11 in direction to the right, thereby limiting the displacement of rod 8 and piston 7.

The moveable and displaceable mold half carrier 5 can be displaced by operation of hydraulic motor means which may include one or several hydraulic cylinders 12. Only one motor is illustrated and suffices for description of this embodiment of the invention. The cylinder is more or less centrally disposed underneath and secured to carrier 5. Particularly, hydraulic cylinder 12 is affixed to carrier at two locations. The cylinder is the driven part of this hydraulic motor for driving the carrier 5.

A piston 13 is stationarily positioned and disposed for relative movement in cylinder 12. Two piston rods, 14a and 14b, hold and extend in opposite directions from piston 13. For example, the left-hand piston rod 14a is secured to support 3, the other piston rod, 14b, is received in support 2, for example, just stuck into an appropriate bore (but sealed therein). Provision for actual relative motion of piston rod 14b in support 2 is not needed; however, play is needed for thermal and/or pressure expansion in case the distance between the supports 2 and 3 on one hand, and/or, the length of the piston rods 14a – 14b on the other hand, varies to a different degree. Of course, rod 14b could be secured to support 2, while rod 14a may slide in a bore in support 3.

These piston rods 14a and 14b have axial bores extending from their respective ends thereof towards piston 13 but terminate respectively in radial bores, leading into cylinder 12 at opposite sides of piston 13. These radial bores lead into the cylinder motor close to piston 13.

As is illustrated schematically only, conduits 16a and 16b lead to a control valve 16. The valve is constructed to apply pressure to either of the conduits, 16a or 16b, while venting the respective other one. Valve 16 has a third operating position (illustrated) in which both lines 16a and 16b (and chamber 12 to both sides of piston 13) are vented.

A pump 15 provides a pressure medium, the flow of which is program controlled by means of slide valves 16 and 17. Valve 16 has just been explained; valve 17 controls application of pressure or venting to the two different pressure chambers 18 and 19. These chambers 18 and 19 are established in cylinder 6 on opposite sides of piston 7.

In the central position of valve 17 (illustrated), the two chambers 18 and 19 are cut off from any fluid supply or venting outlet. In effect, the then fluid filled chambers 18 and 19 establish constant volume and pressure for an incompressible fluid so that the position of piston 7 in chamber 6 becomes invariable, and piston 7 is coupled to carrier 5, either for displacement therewith, or for position locking thereof, when piston 7 (by locked rod 8) is by itself position arrested.

When shifted to the left, valve 17 causes pump pressure to be applied to chamber 18, while chamber 19 is vented (i.e., the pressure therein is reduced). In the third position, chamber 19 is pressurized while chamber 18 is vented. The two chambers 18 and 19 are alternatingly, oppositely pressurized and depressurized by operation of valve 17 or the pressure state is maintained in both of them.

The operation and timing of valves 16 and 17 is program-controlled, so is the hydraulic operation for locking members 10, using known valves for that purpose which is not shown in the drawing and is conventional operation. Considering the construction as illustrated, it should be mentioned that the position of the several parts establish a mold closing state of operation. That state is defined specifically as follows:

In the mold closing state chamber 19 is pressurized while chamber 18 is depressurized. The chambers to the left and to the right of piston 13 (see central position of valve 16) are both depressurized; in other words, the motor for moving carrier 5 does not or does not have to provide mold closing pressure. The one shoulder of rod 8 bears against protracted locking members 10, so that the assembly 7, 8 and 11 is limited as far as displacement to the left is concerned. This assembly, thus, bears against support 3, and pressurization of chamber 19 acts as mold closing force. It is further assumed that the mold height has particular value which is indicated by the relative position of piston 7 inside cylinder 6.

Mold opening and closing each is provided as a two step operation. Initial opening and subsequent retraction of the mold half 21 for opening, preliminary or almost-closing and final closing. Initial opening and final closing involves displacement of the mold halves to each other by a few millimeters, and that in particular involves small displacements between carrier 5 and piston 7 only. For complete retraction and subsequent return, hydraulic motor 12/13 moves carrier 5 and piston 7 in unison.

For opening the molds an operation is carried out as follows: Through program control, valve 17 is shifted to the left, and chamber 18 is pressurized while chamber 19 is depressurized somewhat but not emptied. Accordingly, the displaceable mold carrier 5 moves hydraulically by a few millimeters to the left, i.e., towards support 3, piston 7 still bears against that support. This displacement of the carrier relative to piston 7 opens the mold initially. Subsequently, valve 17 returns to the illustrated position and chambers 18 and 19 are closed off again. There is now re-established a quasi-rigid connection between piston 7 and carrier 5 that contains cylinder 6, due to the essentially incompressible liquid maintained in chambers 18 and 19.

Subsequently locking members 10 are retracted, and slide valve 16 has been program-operated for a shift to the left, thereby causing pressure medium to flow into the chamber to the left of piston 13, via the axial-radial bore in rod 14a. Piston 13 remains stationary, but cylinder 12 and carrier 5 are displaced to the left. Piston 7 being operatively connected to the carrier 5 by operation of the closed liquid-filled chambers 18 and 19, follows that displacement, because rod 8 has been unlocked. Therefor, the position relation of piston 7 in cylinder 6 does not change during displacement of carrier 5 to the left, as long as chambers 18 and 19 remain closed.

After the injection molded object has been removed from the fully open mold, control valve 16 is shifted to the right through program control and pressurizes the chamber to the right of piston 13 via line 16b and rod 14b, in order to move carrier 5 as well as piston 7 and rod 8 back, towards the stationary mold half 20; but mold half 21 stops at a distance of a few millimeters from mold half 20. Pressure medium in the motor chamber to the left of piston 13 flows back into the reservoir.

After locking members 10 have been protracted again so as to lock the position of rod 8, valve 17 shifts to the right for controlling pressurization of chamber 19 and depressurization of chamber 18. Thereupon mold 20/21 is closed completely because member 5 is displaced to the right relative to piston 7, the piston rod 8 bearing against locks 10 and support 3 to provide for stationary position reference for this final hydraulic mold closing. After the mold has been closed another injection can take place. The mold is maintained in closed position by depressurizing the carrier motor and by keeping chambers 18 and 19 closed and rod 8 locked.

Should the mold height change, it is only necessary to change the position of piston 7 relative to the carrier 5 in one or the other direction, so that the dimensions of pressure chambers 18 and 19, when operating in closed off condition, are modified as to volume and that, in turn, establishes a new relative position of piston 7 in chamber 6 for initial opening, final closing and for maintaining the mold closed with the same position lock of rod 8.

Therefore, it can be seen that upon practicing the present invention in a manner outlined above, the object of the invention is fulfilled in that the entire length of the mold closing apparatus can be shortened by about 15 percent as compared with known machines, because the mold carrier motor 12/13 can be disposed and placed underneath the rods 4. Moreover, many heretofore deemed necessary parts are no longer needed because of the insertion of piston 7 into the cylinder 6 as established in the carrier 5. This way, the final closing, the initial opening of the mold, as well as mold height adjustment, can be carried out by means of the same components, so that actually the piston/cylinder arrangement in carrier 5 fulfills three different functions; in addition to those two just mentioned, chambers 18 and 19 transmit hydraulically the force needed to keep the mold closed, while piston 7 with rod 8 is locked. Motor 12/13 just moves carrier 5 under low load condition and is not used for providing mold closing and opening forces.

A particular safety feature of the invention is to be seen in that all conduits for the pressurized medium are stationary. Moreover, as only one of the rods 14a, 14b, is secured, longitudinal expansion of the rods 4 will not tend to bend under unduly stress of rods 14.

The invention is not limited to the embodiments described above but all changes and modifications thereof not constituting departures from the spirit and scope of the invention are intended to be included.

I claim:

1. In an injection molding machine using a stationary platen for support of a first mold half, and a movable platen for the second mold half, there being a carrier for the movable platen, movably disposed on rods extending between first and second stationary supports, the first support also supporting the stationary platen, the movable carrier having a cylinder chamber, there being a first piston in the chamber, the improvement comprising:

a rod on the first piston extending out from the chamber;

lock means having first operating position to position lock the rod in a particular position, wherein the rod bears against the second support, and having second operating position permitting displacement of the rod and piston from the particular position;

a hydraulic motor including a cylinder and a second piston, the cylinder of the motor attached to the carrier underneath thereof, the second piston of the motor disposed in the cylinder thereof, and having two piston rods, one thereof secured to one of the first and second supports, the other piston rod of the two slideably extending into the other one of the supports;

first hydraulic control means for selectively pressurizing the cylinder of the motor for relative displacement thereof by action on the second piston, thereby displacing the carrier and the piston in the second operating position of the lock means; and second hydraulic control means for selectively pressurizing the chamber in the carrier on one or the other side of the first piston in the chamber, for relative displacement of the carrier, relative to the piston in the first operating position of the lock means, and closing the chamber so that incompressible pressure fluid therein couples the first piston to the carrier for common displacement upon operation of the hydraulic motor and when the lock means is in the second operating position.

2. In a machine as in claim 1, the piston rods of the motor having axial bores continued in radial bores that terminate in the cylinder of the motor respectively at the two sides of the second piston therein.

* * * * *